United States Patent [19]

Sadler

[11] 4,296,496

[45] Oct. 20, 1981

[54] EMERGENCY RADIO FREQUENCY WARNING DEVICE

[76] Inventor: William S. Sadler, 2000 Fernwood Ave., St. Paul, Minn. 55113

[21] Appl. No.: 964,152

[22] Filed: Nov. 28, 1978

Related U.S. Application Data

[63] Continuation of Ser. No. 674,727, Apr. 6, 1976, abandoned, which is a continuation-in-part of Ser. No. 485,761, Jul. 3, 1974, Pat. No. 3,949,300.

[51] Int. Cl.[3] .......................... H04K 3/00; H04B 1/02

[52] U.S. Cl. .......................................... 455/1; 455/54; 455/102; 340/33

[58] Field of Search ................ 340/32.33, 171 R, 208, 340/539, 384 E; 455/1, 46, 54, 57, 59, 102, 103, 109, 101, 118

[56] References Cited

U.S. PATENT DOCUMENTS

| | | | |
|---|---|---|---|
| 2,448,055 | 8/1948 | Silver et al. | 325/35 |
| 2,465,341 | 3/1949 | Altovsky | 325/132 |
| 2,658,992 | 11/1953 | Byrne | 325/132 |
| 2,994,765 | 8/1961 | Adam | 325/132 |
| 3,023,309 | 2/1962 | Foulkes | 325/153 |
| 3,104,393 | 9/1963 | Vogelman | 325/153 |
| 3,184,690 | 5/1965 | Garland | 325/138 |
| 3,358,234 | 12/1967 | Stover | 325/49 |
| 3,617,892 | 11/1971 | Hawley | 325/139 |
| 3,660,811 | 5/1972 | Vail et al. | 325/132 |

*Primary Examiner*—Jin F. Ng

*Attorney, Agent, or Firm*—Cushman, Darby & Cushman

[57] ABSTRACT

An emergency radio warning device in the form of a broad band radio frequency interference generator. A broad band generator generates a broad band beat signal which is coupled to a mixer. An audio signal which corresponds to an audio warning signal, such as a whistle or a siren, modulates an R-F carrier signal in a balanced modulator to provide a double side band signal. This signal is modulated by the broad band beat signal in the mixer, amplified and transmitted so that the radios in vehicles in the immediate area will receive an audible interference signal regardless of the particular channel to which the radio is turned. The audible interference signal may be an intelligible reproduction of the input audio signal so that the driver of the vehicle can determine whether the warning signal is generated by a train whistle, a siren, or a human voice. If desired, the double side band signal can be filtered to provide a single side band signal in order to reduce the power requirements of the system.

9 Claims, 1 Drawing Figure

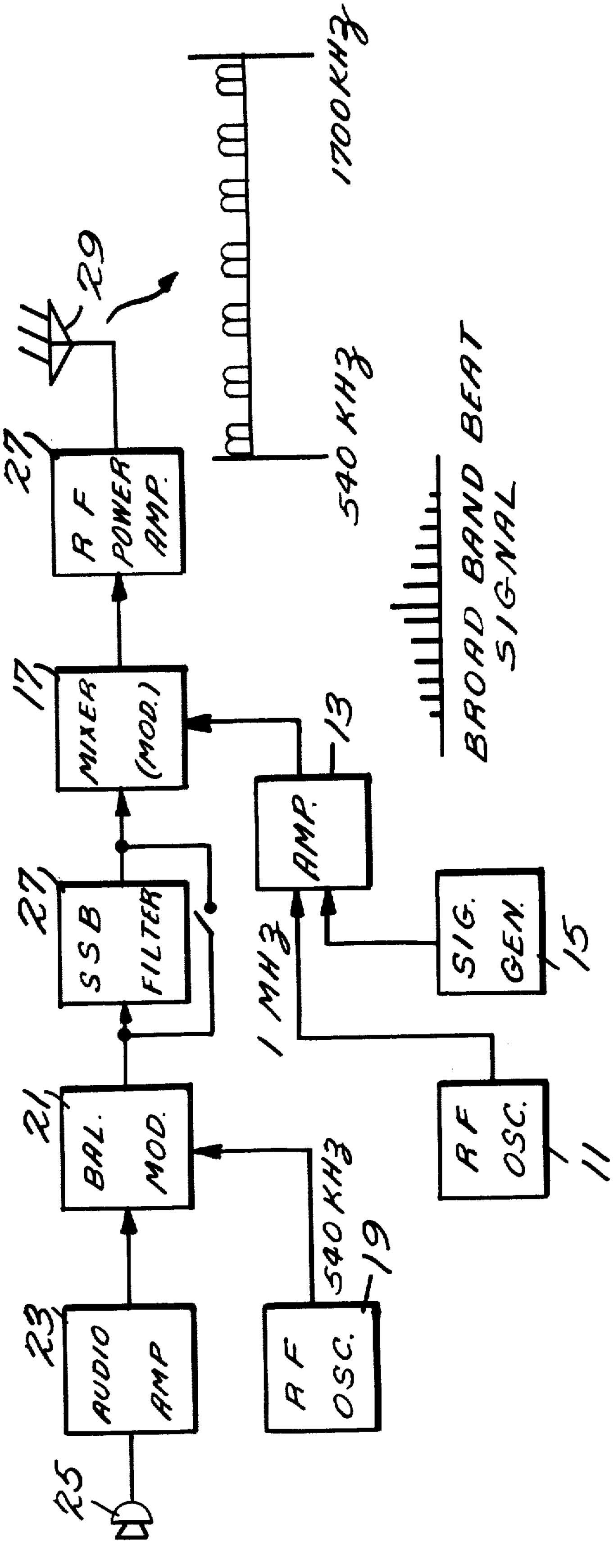
AUDIO AMP
23
25
RF OSC.
19
540 KHz
BAL. MOD.
21
SSB FILTER
27
MIXER (MOD.)
17
RF POWER AMP.
27
29
AMP.
13
1 MHz
SIG. GEN.
15
RF OSC.
11
540 KHz
1700 KHz
BROAD BAND BEAT SIGNAL

EMERGENCY RADIO FREQUENCY WARNING DEVICE

This is a continuation of application Ser. No. 674,727 filed Apr. 6, 1976, now abandoned, which is a continuation-in-part of U.S. application Ser. No. 485,761 filed July 3, 1974, now U.S. Pat. No. 3,949,300 issued Apr. 6, 1976.

BACKGROUND OF THE INVENTION

This invention relates to a radio frequency safety device and more specifically to an emergency radio frequency device for warning radio listeners of potential danger.

The passenger compartments of automobile vehicles have become increasingly insulated from outside noise. Thus, drivers of such vehicles have become relatively isolated from normally audible danger signals, such as sirens, whistles and horns which generate sound waves which are to a large extent attenuated before reaching the driver's ears. This trend towards an increased isolation of the driver has been enhanced because of the use of air-conditioning which encourages the driver and passengers to keep the windows of the vehicle closed. When, for example, the windows of a vehicle are closed and the radio is playing, the aforementioned warning signals are often not heard, thereby placing the driver and the passengers of the vehicle in a potentially dangerous circumstance.

It therefore is an object of this invention to provide a means for warning passengers in a vehicle of the actuation of a siren or warning whistle in the surrounding area.

It is another object of the present invention to provide a radio frequency safety device for interfering with radio signals to generate a recognizable reproduction of a warning sound.

SHORT STATEMENT OF THE INVENTION

Accordingly, this invention relates to a radio frequency safety device which includes a means for generating a broad band beat signal. An audio signal which corresponds to an audible warning signal, such as a whistle, a siren or a human voice, is coupled to a balanced modulator wherein the audio signal modulates an R-F carrier signal to provide a double side band signal. This signal is modulated by the broad band beat signal in a mixer, amplified and transmitted so that the radios in vehicles in the immediate area will receive an audible interference signal regardless of the particular channel to which the radio is tuned. The audible interference signal is an intelligible reproduction of the input audio signal so that the driver in the vehicle can determine whether the warning signal is generated by a train whistle, a siren or a human voice.

In an alternate embodiment, the output of the balanced modulator may be filtered to provide a single side band signal which modulates the broad band R-F signal. Such a single side band modulation signal will reduce the power requirements of this system.

BRIEF DESCRIPTION OF THE DRAWING

Other objects, features and advantages of the invention will become more fully apparent from the following detailed description, appended claims and accompanying drawing which is a schematic illustration of the radio frequency safety device of the present invention.

DETAILED DESCRIPTION OF THE PREFERRED EMBODIMENT

Refer now to the FIGURE where there is disclosed in schematic block diagram form the radio frequency interference generator of the present invention. An R-F oscillator 11 of conventional design generates a signal which is in the AM broadcast band. This signal is coupled to a broad band amplifier, also of conventional design, 13. A second input to the amplifier 13 is derived from a signal generator 15 which may be in the form of a multi-frequency synthesizer or a pulse modulator. If the signal generator 15 is in the form of a pulse modulator, a 10 kHz squarewave would preferably be generated and coupled to the broad band amplifier 13. The output of the broad band amplifier 13 would be in the form of a broad band beat signal such as illustrated at the output of amplifier 13. The center frequency would be 1 mHz with side band beat signals every ten kilohertz therefrom.

In the alternative, if a multi-frequency synthesizer is provided, a plurality of discrete frequency signals ranging from 540 kHz up to 1650 kHz in 10 kHz increments is generated. This signal beats with the output of the R-F oscillator 11 which preferably has a frequency in the middle of the AM broadcast band to provide a broad band beat signal at the output of amplifier 13, such as illustrated in the drawing. The broad band beat signal at the output of amplifier 13 will include beat signals spaced apart by 10 kHz across the AM frequency spectrum which are coupled to an AM mixer or modulator 17 which is of conventional design known in the art.

A second R-F oscillator 19 generates an R-F signal having a frequency, for example, of 540 kHz which is coupled to a balanced modulator 21 which is of conventional design. The R-F signal from oscillator 19 is modulated in the modulator 21 by an audio signal from audio amplifier 23. The audio signal may be, for example, an electronic duplication of the sound of the train whistle or vehicle siren or may be directly derived from such a whistle or siren or human voice by means of an appropriate transducer 25. The output of the balanced modulator 21 is a double side band signal. If desired, one of the side bands can be eliminated by means of a single side band filter 27. The output of the single side band filter 27 or in the alternative, if a double side band signal is desired, the output of the balanced modulator 21 is coupled to the mixer 17 wherein the modulated signal is mixed with the broad band beat signal from the output of the broad band amplifier 13. This signal is amplified by an R-F power amplifier 27 and transmitted by means of an antenna 29.

The power ranges and the antenna utilized are chosen so that the range of the interference signal transmitted is approximately 1,000 feet so that the range of interference is approximately the same as conventional audio warning devices now in use. This is a sufficient distance to provide surrounding vehicles with a warning that a train or vehicle which is sounding the warning is approaching. Carrier reinsertion for demodulation is accomplished by utilizing existing broadcast signals. This reduces power requirements.

The interference provided by the signal output of the mixer 17 results in radio receivers generating a noise output which varies at an audio rate and hence can be detected by the driver or passenger in a vehicle receiving the signal. Further, since the random noise signal is modulated by the audio signal derived from a siren, horn or from a voice, this sound information is transmitted to the radio receivers. Thus, the driver hears a recognizable reproduction of the warning siren, horn or voice signal. This is invaluable in assisting the driver in understanding the nature of the warning, i.e., a fire or truck siren, a train whistle, etc. It, therefore, can be seen that the present invention relates to an important method and apparatus for warning drivers of vehicles within a given area of impending danger. Further, since a balanced modulator 21 is utilized, the carrier signal is suppressed, thereby reducing the power requirements for transmitting the interference signal. Further reduction in power requirements may be achieved by coupling a single side band modulated signal to the mixer 17. In any event, by eliminating the carrier by utilizing a balanced modulator 21, the radiation efficiency is substantially improved because of the reduced overall band width of the system.

While the present invention has been disclosed in connection with a preferred embodiment thereof, it should be understood that there may be other obvious modifications to the invention which fall within the spirit and scope of the invention as defined by the appended claims.

What is claimed is:

1. A radio frequency warning device for communicating with an AM radio receiver adapted to receive signals on any one of a plurality of AM broadcast carrier frequencies comprising:

means for generating a signal having components ranging across a broad frequency band;

means for generating an R-F signal;

means responsive to an audio frequency signal and said R-F signal for causing the generation of a suppressed carrier modulation signal;

means for modulating said suppressed carrier modulation signal and said broad band frequency signal to thereby generate a broad band AM radio interference signal having respective components at frequencies simulating sidebands to each of said plurality of AM broadcast carrier signals; and means for transmitting said broad band interference signal, said broad band interference signal generating an intelligible audio signal when received by said AM radio receivers tuned to any of said plurality of carrier frequencies.

2. The radio frequency warning device of claim 1 wherein said suppressed carrier modulation signal is a double side band signal.

3. The radio frequency device of claim 2 wherein said broad band signal is a broad band beat signal having a plurality of frequency components spaced from one another by a predetermined frequency interval.

4. The radio frequency warning device of claim 3 wherein said means for generating a signal having a broad frequency band comprises a radio frequency oscillator for generating an R-F signal, a pulse generator for generating a repetitive pulse signal, and means for modulating the radio frequency signal by said repetitive pulse signal.

5. The radio frequency warning device of claim 3 wherein said means for generating said broad band signal comprises means for generating an R-F signal, means for generating a multi-frequency R-F signal, said multi-frequency R-F signal having frequencies which are separated from one another by a predetermined frequency interval, and means for modulating said R-F signal with said multi-frequency signal.

6. A radio frequency warning device for providing an intelligible audio signal on a plurality of predetermined AM radio broadcast carrier frequencies comprising:

means for generating a broad band frequency signal having frequency components at, at least, a plurality of predetermined frequencies, said frequency components being separated in frequency by a predetermined amount;

means for generating an R-F signal;

means responsive to an audio frequency warning signal and said R-F signal for generating a suppressed carrier modulation signal; and means for modulating said suppressed carrier modulation signal and said broad band frequency signal to thereby generate a plurality of AM radio frequency warning signals at frequencies simulating sidebands to each of said AM radio broadcast carrier frequencies to provide an audio warning signal component on each of said predetermined AM radio broadcast carrier frequencies.

7. The radio frequency warning device of claim 6 wherein said suppressed carrier modulation signal is a double side band signal.

8. The radio frequency warning device of claim 7 wherein said means for generating a signal having a broad frequency band comprises a radio frequency oscillator for generating an R-F signal, a pulse generator for generating a repetitive pulse signal, and means for modulating the radio frequency signal by said repetitive pulse signal.

9. The radio frequency warning device of claim 6 wherein said means for generating said broad band signal comprises means for generating an R-F signal, means for generating a multi-frequency R-F signal, said multi-frequency R-F signal having frequencies which are separated from one another by a predetermined frequency interval, and means for modulating said R-F signal with said multi-frequency signal.

* * * * *